(12) United States Patent
Moor

(10) Patent No.: US 7,195,674 B2
(45) Date of Patent: Mar. 27, 2007

(54) CONTINUOUS PAN CRYSTALLIZER

(76) Inventor: Bruce StClair Moor, 7 Alida Place, Cowies Hill, 3610, Kaw Zulu-Natal (ZA)

( * ) Notice: Subject to any disclaimer, the term of this patent is extended or adjusted under 35 U.S.C. 154(b) by 395 days.

(21) Appl. No.: 10/778,158

(22) Filed: Feb. 17, 2004

(65) Prior Publication Data
US 2004/0177846 A1 Sep. 16, 2004

Related U.S. Application Data

(63) Continuation-in-part of application No. PCT/ZA01/00117, filed on Aug. 14, 2001.

(51) Int. Cl.
*C13G 1/00* (2006.01)
*C13F 1/62* (2006.01)
*B01D 1/06* (2006.01)
*B01D 9/00* (2006.01)

(52) U.S. Cl. .................. 127/16; 127/15; 159/27.1; 159/28.2

(58) Field of Classification Search .................. 127/15, 127/16, 61; 159/27.1, 28.2
See application file for complete search history.

(56) References Cited

U.S. PATENT DOCUMENTS 1,586,814 A * 6/1926 Leonard .................. 159/27.1
5,223,040 A 6/1993 De Cremoux

FOREIGN PATENT DOCUMENTS

| EP | 0 065 775 A2 | 12/1982 |
| EP | 0 201 629 A3 | 11/1986 |
| EP | 0 488 839 A1 | 6/1992 |
| WO | WO 01/91875 A1 | 12/2001 |

* cited by examiner

*Primary Examiner*—David A. Reifsnyder
(74) *Attorney, Agent, or Firm*—Young & Thompson

(57) ABSTRACT

A continuous pan crystallier for use in the sugar industry includes a heated zone in the form of a steam chamber (32) below a calandria (22). The heated zone heats massecuite in the area below the calandria in the pan and reduces massecuite density and viscosity and promotes the vigorous circulation required for even crystal growth.

13 Claims, 2 Drawing Sheets

CONTINUOUS PAN CRYSTALLIZER

TECHNICAL FIELD OF THE INVENTION

Figure 1:
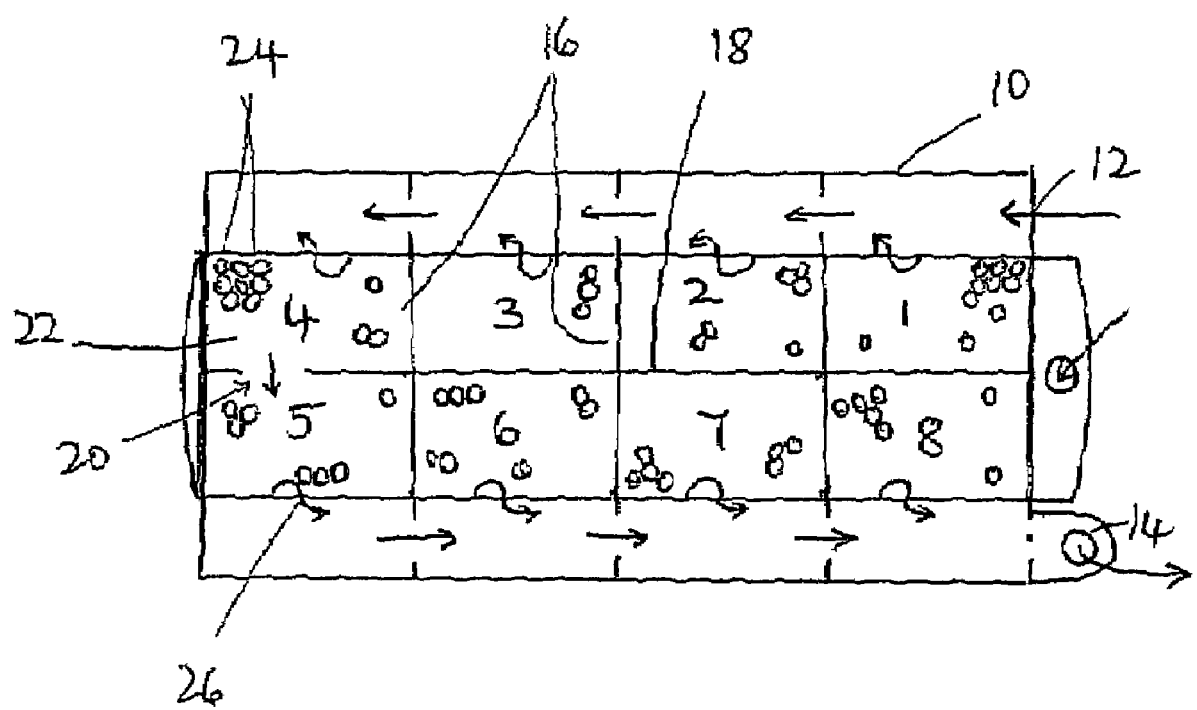

This invention relates to improvements to continuous vacuum pans as currently in use in the cane and beet sugar manufacturing industries.

BACKGROUND ART

The crystallisation stage of sugar recovery and manufacture from clarified, concentrated cane or beet juice is nowadays commonly performed in continuous pans. Most of these continuous pans are designs of the "horizontal type". These incorporate a horizontally arranged calandria, into which steam or vapour is fed to cause heating and boiling of the massecuite (sugar crystals and molasses). As the massecuite boils in the calandria, vapour (steam) bubbles form. These bubbles and the higher temperature lower the massecuite density, inducing the massecuite to circulate up through the calandria. The vapour separates at the surface and the massecuite then returns down around the calandria through an open, unheated "downtake" passage, into the zone beneath the calandria.

Vigorous circulation is highly desirable both for even crystal growth and for good heat transfer from the calandria.

In most conventional pan designs, the zone beneath the calandria is bounded by the cool outer shell of the pan vessel. This cools the adjacent massecuite, causing two problems:

Density of the massecuite is increased in an area where upflow is desired, and

A layer of sugar/massecuite may settle and solidify in this area.

The encrustation on unheated surfaces is of particular concern and has been reported in technical literature on continuous pans.

In one well-known pan as described in EP-A-0065775, the invention comprises two or more similar cells of a vacuum pan stacked one upon another. Each cell is supplied by active heating steam from a common supply i.e. at a common pressure and temperature. Each cell boils with the spaces above the massecuite interconnected, and therefor the spaces have passive steam at a common pressure. In the lowest cell, the space below the massecuite is surrounded by the external atmosphere. In the cells other than the lowest one, the space below is surrounded by the passive steam of the cell below. The passive steam is at a temperature lower than that of the masseuite above and cannot therefor promote circulation or induce boiling as required in the present invention.

The pan described in EP-A-0065775 requires the use of mechanical stirrers to promote circulation and avoid encrustation and build-up on these lower, cooler surfaces. This requirement is obviated by the arrangement of the present invention.

It is an object of this invention to provide an arrangement which reduces or at least prevents increased massecuite density and solidification due to cooling in the zone beneath the calandria.

THE INVENTION

According to the invention a continuous pan crystalliser includes one or more heated zones located below a calandria.

In the preferred form of the invention, a heated zone comprises a steam chamber. Also in the preferred form the steam chamber has one or more inlets from the base of the calandria which is vertically disposed. This enables steam circulating in the calandria to enter the steam chamber to heat the base of the pan by conduction.

The base of the chamber may be curved inwardly and upwardly toward the centre of the pan, thus forming a circulatory flow-path for the massecuite toward the calandria.

The steam entering the steam chamber is the same pressure and therefor the same temperature as that entering the calandria and accordingly is sufficiently heated to firstly heat the base of the pan and secondly, by conduction, heat the massecuite at the base of the pan above the steam chamber, to a temperature sufficient for boiling. The temperature in the steam chamber is therefor sufficiently high to boil the massecuite.

In most prior art pans, this zone below the calandria tends to be cooled by the cool outer shell of the pan. The heating of this zone by the introduction of steam into a steam chamber located directly therebelow maintains the massecuite here at a lower density and induces circulation thereof, further assisting to prevent solidification of the massecuite in this zone.

The primary cause of cooling of massecuite and encrustation in the cooler zones is the cold surface of the pan, particularly in areas below the calandria. The introduction of a steam chamber as described above, together with the arcuate nature of the base of the pan firstly eliminates or at least greatly reduces the cooling effect and secondly encourages a vigorous circulatory flow through the calandria and around the pan. Even crystal growth is achieved as a result.

EMBODIMENT OF THE INVENTION

Figure 2:
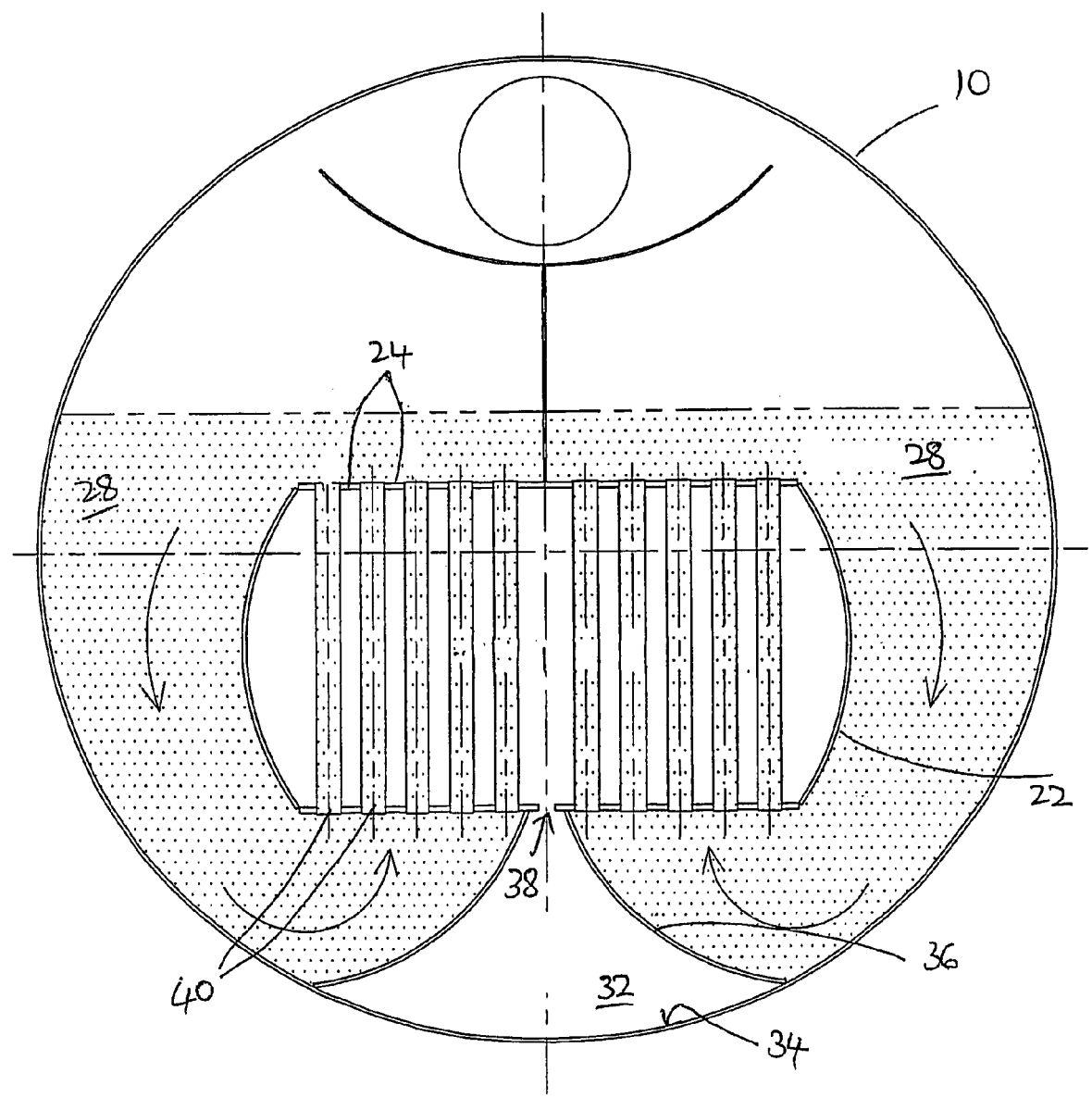

The preferred embodiment of the invention is described below with reference to the accompanying drawings:

FIG. 1 which is a plan view of a continuous pan crystalliser according to the invention; and FIG. 2 which is a sectional side view of the pan.

In FIG. 1, massecuite flows into the pan 10 at 12 and circulates in the direction of the arrows exiting at 14. The pan massecuite space is divided by baffles 16 into (usually) 8 compartments, comprising four along each side of a central baffle 18. Massecuite enters usually at one end compartment. It then flows successively through the compartments on that side, crosses over between compartments 4 and 5 (at the end of the pan 20), and returns along the other side of the pan, being discharged from compartment 8 at outlet 14.

Heating by the calandria 22 causes the massecuite to bubble up through the tubes thereof 24. The circulation induced by the calandria therefore produces a spiral flow (arrows 26) path along each side of the pan.

As evaporation occurs along the pan, additional syrup or molasses feedstock is introduced in each compartment. This provides further sucrose which is assimilated onto the existing sugar crystals in the massecuite, so that the crystals in the discharged massecuite are considerably larger than in the original seed massecuite.

In FIG. 2, a continuous pan crystalliser is generally referenced 10 and is circular in section. Massecuite 28 flows into the pan and is heated primarily by the calandria 22. The calandria is heated by steam which enters the calandria at 30 (FIG. 1), is circulated between the calandria tubes 24 and down into the steam chamber 32.

The steam chamber is defined by a base 34 and curved walls 36 which extend upwardly and inwardly from the base of the pan to converge at an outlet 38 from the base of the calandria.

Massecuite is heated by the calandria and bubbles up tubes 40 before dropping off over the top of the calandria and recirculating in the direction indicated by the arrows.

The circulation is enchanced by the heat provided by the steam chamber 32, which heats massecuite in the zones above the curved walls 36, preventing encrustation.

The invention claimed is:

1. A continuous pan crystallizer, comprising:
   an outer pan (10);
   a calandria with a lower surface and a space for circulating massecuite, the calandria being within the pan;
   a heated zone within the pan and located below the lower surface, the heated zone for heating the lower surface and the calandria in order to heat the massecuite and induce circulation of the massecuite;
   the heated zone being of significantly higher temperature than the boiling temperature of the massecuite, wherein the massecuite is one of cane sugar massecuite and beet suger massecuite.

2. A continuous pan crystalliser according to claim 1, wherein the heated zone comprises a steam chamber, and
   further comprising steam regulation equipment so that steam within the steam chamber is controlled to be of a temperature and pressure sufficient to induce circulation and boiling of the massecuite.

3. A continuous pan crystalliser according to claim 2, wherein,
   the calandria has a base and vertically disposed tubes, and the steam chamber has one or more inlets from the base of the calandria.

4. A continuous pan crystalliser according to claim 2, wherein the base of the steam chamber is curved inwardly and upwardly toward the centre of the calandria facilitating formation of a circulating flow-path for the massecuite toward the calandria.

5. A continuous pan crystalliser according to claim 2, wherein,
   the calandria has vertically disposed tubes, and
   the steam chamber connects to the base to allow steam to circulate in the calandria.

6. A continuous pan crystalliser according to claim 5, wherein,
   steam entering the steam chamber is at the same pressure and the same temperature as the steam entering the calandria, and
   the steam is sufficiently heated to firstly heat the base and secondly, by conduction, to heat the massecuite at the base to a temperature sufficient for boiling the massecuite.

7. A continuous pan crystallizer, comprising:
   a continuous pan calandria with an outer pan (10) having a flow inlet (12) and a flow outlet (14) allowing massecuite to flow into the pan at the inlet and circulate and exit at the outlet;
   a massecuite space within the pan;
   a central baffle (18) within the massecuite space;
   baffles (16) dividing the pan massecuite space into plural compartments along each side of the central baffle, the compartments arranged so that the massecuite enters at one end compartment and flows successively through the compartments on a first side of the central baffle then crosses over the central baffle and flows through the compartments on a second side of the central baffle to exit at the outlet;
   the calandria further comprising vertical tubes (24),
   the massecuite further flowing up through the tubes to produce a spiral flow on each side of the central baffle toward the outlet;
   a heated zone located below the massecuite space and below the tubes, the heated zone configured for heating the massecuite in the massecuite space.

8. A continuous pan crystallizer of claim 7, wherein the heated zone is a steam chamber.

9. A continuous pan crystallizer of claim 8, wherein,
   the steam chamber is defined by a base (34), curved walls (36), and an outlet (38), and
   the curved walls extending upwardly and inwardly from the steam chamber base to converge at the outlet (38).

10. The continuous pan crystallizer of claim 7, wherein the pan is of a cylindrical construction with a central axis horizontally disposed.

11. A continuous pan crystallizer, comprising:
    an outer pan;
    a calandria within the pan and with a lower surface and a space for circulating massecuite;
    a heated zone located below the lower surface, the heated zone providing heating to the lower surface of the calandria sufficient to and induce circulation of the massecuite, wherein the massecuite is one of cane sugar massecuite and beet suger massecuite.

12. The continuous pan crystallizer of claim 1, wherein the pan is of a cylindrical construction with a central axis horizontally disposed.

13. The continuous pan crystallizer of claim 11, wherein the pan is of a cylindrical construction with a central axis horizontally disposed.

* * * * *